(12) United States Patent
Debany et al.

(10) Patent No.: US 7,570,213 B2
(45) Date of Patent: Aug. 4, 2009

(54) METHOD AND APPARATUS FOR DETECTING AND LOCATING INTRUSION IN A WIRELESS NETWORK

(75) Inventors: Warren H. Debany, Rome, NY (US); E. Paul Ratazzi, Rome, NY (US); Frank R. Cole, Rome, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 672 days.

(21) Appl. No.: 11/449,184

(22) Filed: Jun. 6, 2006

(65) Prior Publication Data
US 2006/0281473 A1 Dec. 14, 2006

Related U.S. Application Data

(60) Provisional application No. 60/690,540, filed on Jun. 14, 2005.

(51) Int. Cl.
*G01S 3/02* (2006.01)
*H04W 24/00* (2006.01)

(52) U.S. Cl. .............. 342/458; 455/456.1; 455/456.5
(58) Field of Classification Search ............... 342/458; 455/456.1, 456.5
See application file for complete search history.

(56) References Cited

U.S. PATENT DOCUMENTS

| 6,801,538 B1 * | 10/2004 | Abi-Nassif et al. | 370/445 |
| 7,257,411 B2 * | 8/2007 | Gwon et al. | 455/456.1 |
| 7,308,276 B2 * | 12/2007 | Goren et al. | 455/456.5 |

* cited by examiner

*Primary Examiner*—Thomas H Tarcza
*Assistant Examiner*—Harry Liu
(74) *Attorney, Agent, or Firm*—Joseph A. Mancini

(57) ABSTRACT

Method and apparatus for locating an intruding radio frequency signal in a wireless network. Relative distance measurements are computed between pairs of receivers from a plurality of receivers to the source of the intruding signal based on received signal strength. Loci of possible locations are plotted, points of intersection are determined, and a clustering algorithm is applied, yielding the location of the source of the intruding signal. The invention is distinguished in that its operation does not require knowledge of either the transmitted power or antenna gain of the intruding signal source.

33 Claims, 21 Drawing Sheets

METHOD AND APPARATUS FOR DETECTING AND LOCATING INTRUSION IN A WIRELESS NETWORK

PRIORITY CLAIM UNDER 35 U.S.C. §119(e)

This patent application claims the priority benefit of the filing date of provisional application Ser. No. 60/690,540, having been filed in the United States Patent and Trademark Office on Jun. 14, 2005 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

1. Technical Field of the Invention

This invention relates generally to the field of location of radio frequency transmitters. This invention relates more specifically to the algorithms and processing techniques applied thereto for the location of rogue radio frequency transmitters based upon multiple measures of received signal strength.

2. Prior Art

There exist techniques that can provide an accurate fix on a transmitter's location. Generally, however, these techniques require one or more of the following: a priori knowledge about the transmitter, a finite, calibrated geospatial reference frame, a cooperative transmitter, and/or a large, geographically fixed receiver/network infrastructure.

U.S. Pat. No. 7,006,838 B2 to Diener et al discloses an apparatus and method for determining the location of an unknown wireless radio signal source. The unknown source's signal is received at a plurality of known receiving locations where one of the plurality is used as a reference. The source's signals received at all other receiving locations are compared to the reference. A reference signal is transmitted by a known location whereupon the difference of time of arrival between the known reference signal and the unknown source's signal is computed and the location of the unknown source computed therefrom. This system has the disadvantage, however, in that it is not passively listening to an intruding source, rather it must actively transmit a reference signal having the effect of making its presence known.

U.S. Pat. No. 6,993,592 B2 to Krumm et al discloses a location measurement apparatus and process for determining the location of radio-frequency badges where the badges transmit a message containing their unique identifier to receivers at known locations. The receivers measure signal strength of the transmitting badge if it exceeds a predefined threshold. The receivers then transmit data to a central computer as to the time, identification and received signal strength indication (RSSI) for each badge, which is entered into a table. Locations are computed for those badges whose signal strength exceeds the predefined threshold. This system is an example of an approach where a calibrated geospatial reference frame tracks and locates signal sources. Since the system is calibrated on signal strength to representative locations, the received signal strength at any one of a plurality of fixed position receivers from a source is readily matched up. The utility of this system would be significantly diminished where intruding sources were outside of a calibrated geospatial reference frame because the necessary vectors would be unavailable.

U.S. Pat. No. 6,920,329 B2 to Kennedy, Jr. et al discloses an apparatus and method to find the location of two-way radios amongst a plurality of base stations at known geographic points. The invention employs a time of arrival determination which may also be combined with an angle of arrival determination. With this system, antenna characteristics of the receiving base stations is critical, as well as is their orientation, meaning the system must be well calibrated. This would further suggest that the system has no utility for other than a permanently fixed deployment.

U.S. Pat. No. 6,861,982 B2 to Forstrom et al discloses a method for determining the location of a non-cooperative radio frequency emitter requiring at least three receivers sharing common time with a time reference. Trilateration is employed on signal detection times from emitter to receivers. Since any or all of the receivers may be mobile, communication with the reference provides an accurate adjustment of propagation time in compensation for the receiver's mobility. Since trilateration is employed, this system will have no utility with fewer than three receivers deployed, operating, and in reception of the signal source.

U.S. Pat. No. 7,020,475 B2 to Bahl et al discloses a method for a mobile computer user to determine his location within a building. Wireless base stations are employed at known locations throughout a building. Signal strength is measured and looked up in a table of known locations of base stations and their respective signal strengths. The current location of the mobile computer user is determined as the one corresponding to the most likely base station. The method may be used in the opposite sense where the base stations detect the signal strength of the mobile computer user, provided a reference signal strength versus distance of the mobile computer from the base stations is known. This system, however, depends entirely upon charted signal strengths at predetermined locations within a fixed structure. It would have little utility for geolocating a wider ranging intruder signal source of unknown signal strength.

U.S. Pat. No. 7,019,694 B2 to Krumm et al discloses a method for locating radio frequency transmitters. A plurality of receivers measure and forward signal strength to a central computer. Multiple measured signal strengths attributed to the same transmitter form a locating signal strength vector. Exemplary vectors are generated in a calibration procedure to various locations. The locating signal strength vector is compared to the previously obtained exemplary vectors to determine with which exemplary vector the locating signal strength vector corresponds, so as to determine the location of the radio frequency transmitter. The benefits of this system include reception by as few as only one receiver and compatibility with an existing computer network. The drawback of this system, however, is that it is possible to locate a signal source only if receivers are already placed in, and the network to which they are connected is extended to, every conceivable location a signal source of interest might be.

Angle of Arrival (AoA) and Time Difference of Arrival (TDOA) methods are desirable to use, but they require directional antennas that must be precisely sited and/or complex receiver hardware with additional channel capacity for distributing precise time references. Aside from the time it would take to integrate, calibrate and maintain these components, their addition greatly increases the cost of a wireless intrusion detection system (WIDS).

What is lacking from the prior art is a system that instead employs upon simple omni-directional detection of rogue transmitters without the need for vast databases of a priori information such as calibrated RSSI look-up tables, that, when simply placed in any geospatial location, will immediately begin to detect and geolocate intruding signal sources in a wireless network.

Physical Challenges to Wireless Intrusion Detection a. Detection of Received Signal Strength The present invention performs location solely on the non-directional Received Signal Strength Indication (RSSI) provided by the commercial off-the-shelf (COTS) wireless cards. When the present invention achieves a "sighting" of a rogue transmitter, it logs and reports the observation time, RSSI, and other information. The RSSI alone is not a highly useful measurement in that it provides only two facts: an indication of where the measured RSSI falls within the measurement scale relative to the maximum RSSI; and that a stronger intrusion signal has a higher RSSI than a weaker signal.

b. Omnidirectional Radiation Patterns

Most wireless access points utilize omnidirection antennas in their wireless network infrastructure. These will provide the rogue transmitter a source of entry. RSSI in combination with the analytical tools does provide a valid geolocation method for the case of a rogue transmitter. However, it is clearly invalid for the case of a rogue transmitter employing a high directionality, high gain antenna.

c. Two-Dimensional Geometry

If it is assumed that a rogue transmitter and the WIDS receivers are coplanar, i.e., they are all at the same height or altitude, the mathematical analysis can be limited to two dimensions. However, while a two-dimensional analysis is suitable for a drive-by network intruder scenario, for example, it is clearly inadequate for three-dimensional structures such as multi-floor office buildings.

d. Non-Flat Earth

For distances that are less than a few tens of kilometers it is essentially immaterial that the equations used in the analysis of RSSI are based on plane trigonometry rather than spherical trigonometry. Thus, if a grid system is used, it may be assumed only to be based on rectangular coordinates, where the origin, orientation, and scale are arbitrary. For the characteristically small RSSI reception distances it is sufficient to consider latitude/longitude (lat/long) coordinates to be rectangular on a plane, assuming that longitude is scaled appropriately for the given latitude.

e. Radio Frequency (RF) Propagation Effects

Little about RF propagation, particularly through unknown numbers and composition of walls, can be assumed. The single greatest variation seems to be the nearly random factor of radio frequency (RF) attenuation due to the environment: walls, floors, ceilings, people, and other obstructions. In particular, the attenuation due to walls is most unpredictable, as their composition and style of construction vary widely within even a small area of a building. Signal paths that may be clear line-of-sight or travel through one, two, three, or more walls must be accounted for. However, experiments have indicated that, in practice, the ceteris paribus principle held and RF attenuation seemed to balance out on the multiple paths.

f. Necessary Conditions

Rogue network intruders must transmit There is no way for a WIDS receiver to detect a purely passive monitor. WIDS sightings must be simultaneous to detect a mobile rogue transmitter. Stationary transmitters, which transmit periodically, can be located by integrating measurements obtained over a period of time.

OBJECTS AND SUMMARY OF THE INVENTION

The present invention provides a method and apparatus for detecting the presence of and locating the source of a radio frequency signal.

It is therefore an object of the present invention to provide a method and apparatus for locating an intruding radio frequency signal in a wireless network.

It is a further object of the present invention to provide a method and apparatus for determining the relative distance between the source of an intruding signal and two receivers based on respective received signal strength indications.

It is still a further object of the present invention to provide a method and apparatus for determining the location of an intruding signal source by identifying the intersection of loci of possible locations.

It is yet still a further object of the present invention to provide a method and apparatus for detecting and locating the source of an intruding signal without dependence upon directional antennas.

It is yet another object of the present invention to provide a method and apparatus for detecting and locating the source of an intruding signal without dependence upon knowledge of either or both the transmitting power or antenna gain of the intruding signal source.

An additional object of the present invention is to provide a method and apparatus for detecting and locating the source of an intruding signal without dependence upon time synchronization between receivers.

An additional object of the present invention is to provide a method and apparatus for detecting and locating the source of an intruding signal without being limited to locating such sources only within a pre-calibrated geospace.

Briefly stated, the present invention, method and apparatus for detecting and locating intrusion in a wireless network, achieves these and other objects through computing relative distance measurements between pairs from a plurality of receivers to the source of the intruding signal based on received signal strength and through determining the loci of possible locations, by plotting the loci, by finding the points of intersection of these loci and by applying a clustering algorithm thereto from which the actual location of the source of the intruding signal is found. The present invention is distinguished from the prior art in that its operation does not rely upon knowledge of either the transmitted power or antenna gain of the intruding signal source.

In the fundamental embodiment of the present invention, method for detecting and locating a transmitting source of a radio frequency (RF) signal intrusion into a wireless network, an intruding radio frequency signal is first received by a plurality of receivers. The received signal strength $R_i$ is then measured on each of the plurality of receivers. For each paired combination of receivers, one relative distance measurement d to the location of the transmitting source is computed, where the one relative distance measurement d is a function of the received signal strength $R_i$ of each of the receivers in each of the paired combinations. For each paired combination of the plurality of receivers, the possible locations of the transmitting source lying on the locus of points satisfying $d=[R_1/R_2]^{1/2}$ is computed. The computation further comprises computing the displacement c of the center of the locus from the first receiver in each paired combination according to $$c = \frac{D}{2}\left[\frac{1}{1+d} + \frac{1}{1-d}\right]$$

where D is the distance between the receivers in each paired combination. The radius r of the locus is computed according to $$r = \left|\frac{D}{2}\left[\frac{1}{1+d} + \frac{1}{1-d}\right]\right|$$

and the coordinates $(x_c, y_c)$ of the point about which the locus is centered satisfying $$x_c = x_1 + \frac{c}{D}(x_2 - x_1)$$

and $$y_c = y_1 + \frac{c}{D}(y_2 - y_1) \text{ is}$$

computed, where $(x_1,y_1)$ and $(x_2,y_2)$ are the coordinates of the first and the second receivers in each paired combination, respectively. The intermediate points of intersection of all loci corresponding to all paired combinations are then computed. Finally, the actual points of intersection from the intermediate points of intersection of all the loci of points are computed so as to determine an unambiguous location of the transmitting source.

According to a fundamental embodiment of the present invention, method for detecting and locating a transmitting source of a radio frequency (RF) signal intrusion into a wireless network, the number of possible loci on which an intruding radio frequency signal source may be located is determined as M, where $$M = \binom{N}{2} = \frac{N^2 - N}{2}$$

and where N is the number of receivers in reception of the intruding signal.

Still according to a fundamental embodiment of the present invention, method for detecting and locating a transmitting source of a radio frequency (RF) signal intrusion into a wireless network, the number of possible points at which the loci intersect and at which an intruding radio frequency signal source may be further deemed to be located is determined as I, where $$I = 2\binom{M}{2} = M^2 - M = \frac{N^4}{4} - \frac{N^3}{2} - \frac{N^2}{4} + \frac{N}{2},$$

where N is the number of receivers in reception of the intruding signal and M is the number of possible loci of points on which an intruding radio frequency signal source may be located.

In contrast to and in improvement upon prior art devices, the present invention may be rapidly deployed to an unsurveyed and uncalibrated location and commence locating a radio frequency source. This is a fundamental need which has yet been unfulfilled in the prior art.

The above, and other objects, features and advantages of the present invention will become apparent from the following description read in conjunction with the accompanying drawings, in which like reference numerals designate the same elements.

REFERENCES

[Aldu04] R. Aldunate, M. Nussbaum, and F. Pena-Mora, "An Empirical Wi-Fi Based Location Mechanism for Urban Search and Rescue Operations," in *Proceedings, Wired/Wireless Internet Communications, 2nd International Conference* (WWIC 2004), Berlin: Springer-Verlag, 2004.

[Eng04] P. Enge, "Retooling the Global Positioning System," *Scientific American*, May 2004, pp. 90-95.

[Li02] D. Li, K. D. Wong, Y. H. Hu, and A. M. Sayeed, "Detection, Classification, and Tracking of Targets," IEEE Signal Processing Magazine, March 2002, pp. 17-29.

[Men73] W. Mendenhall and R. L. Scheaffer, Mathematical Statistics with Applications, North Scituate Mass.: Duxbury Press, 1973.

[Per03] P. E. Pertilä, T. W. Pirinen, A. J. Visa, and T. S. Korhonen, "Comparison of Three Post-Processing Methods for Acoustic Localization," *Proceedings, Unattended Ground Sensor Technologies and Applications V*-5090, SPIE AeroSense, 2003.

[Smi98] A. A. Smith Jr., *Radio Frequency Principles and Applications*, Piscataway N.J.: IEEE Press, 1998.

[Spi68] M. R. Spiegel, Mathematical Handbook, NY: McGraw-Hill Book Company, 1968.

[Stra97] G. Strang and K. Borre, Linear Algebra, Geodesy, and GPS, Wellesley Mass.: Wellesley-Cambridge Press, 1997.

[Tou74] J. T. Tou and R. C. Gonzalez, Pattern Recognition Principles, Reading Mass.: Addison-Wesley Publishing Company, 1974.

DETAILED DESCRIPTION OF THE PREFERRED EMBODIMENT

Received Signal Strength Indication (RSSI) vs. Distance

Since a WIDS receiver in the present invention can measure 100 only RSSI, the first step thereafter is to convert measured RSSI to some measure of the distance 110 from a WIDS receiver to the rogue transmitter.

There is a wealth of literature dealing with geolocation based on the absolute measurement of distance. Today's most notable example of this approach is the Global Positional Service (GPS); see, for instance, the detailed description by Strang and Borre [Stra97] or a recent Scientific American article on GPS [Eng04]. Strang and Borre [Stra97, p. 448] describe the basis of GPS as follows: "Its measurements yield distances and not angles. We are dealing with trilateration and not triangulation. This has been desired for centuries, because angles are definitely awkward." On a surface (i.e., a 2-D world) three distances define three circles that ideally intersect at a single point: the target. GPS (in the 3-D world) finds the intersection of spheres—there are two solutions with three spheres but one is discarded as being too far from the Earth's surface. While technically. GPS trilaterates, in fact GPS needs at least one or more additional satellites in view to compensate for timing errors that result in distance errors. Time is thus considered to be a fourth dimension. In the present invention the term multilateration is used instead of trilateration, as usually more than three distances are measured.

As for the measured RSSIs of the present invention, it has already been pointed out that both the characteristics of the rogue transmitter and the RF propagation conditions are unknown. Therefore the present invention performs at best a relative distance measurement.

Figure 1A:
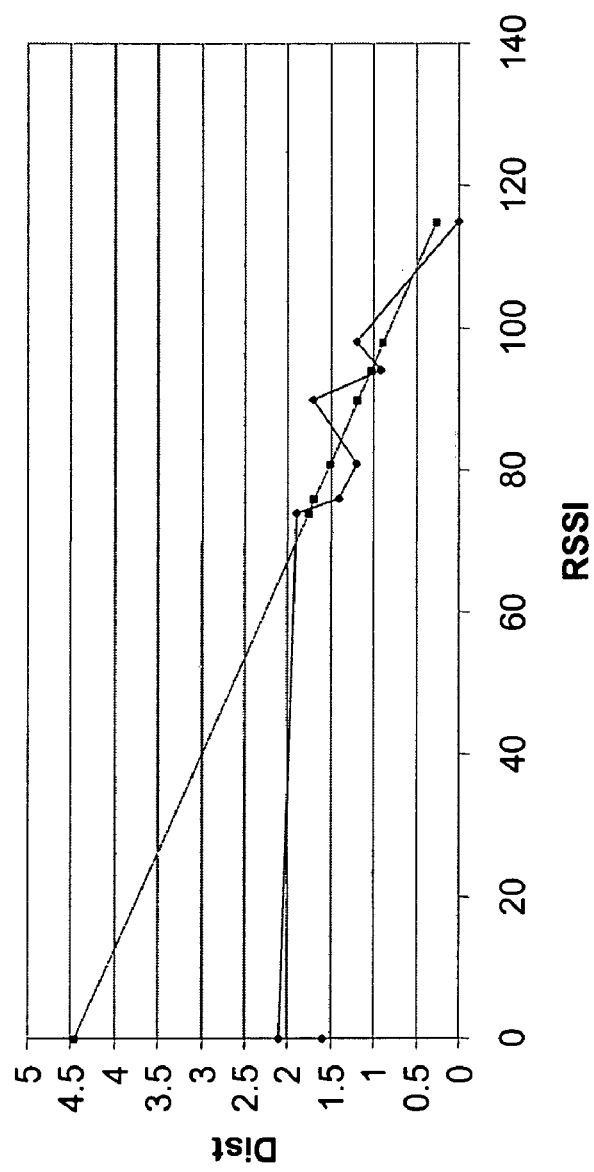
FIG. 1a and FIG. 1b depict the distance measurement based on WIDS RSSI and the steps to accomplish the same. "Best straight line" from linear regression is shown.
Figure 1B:
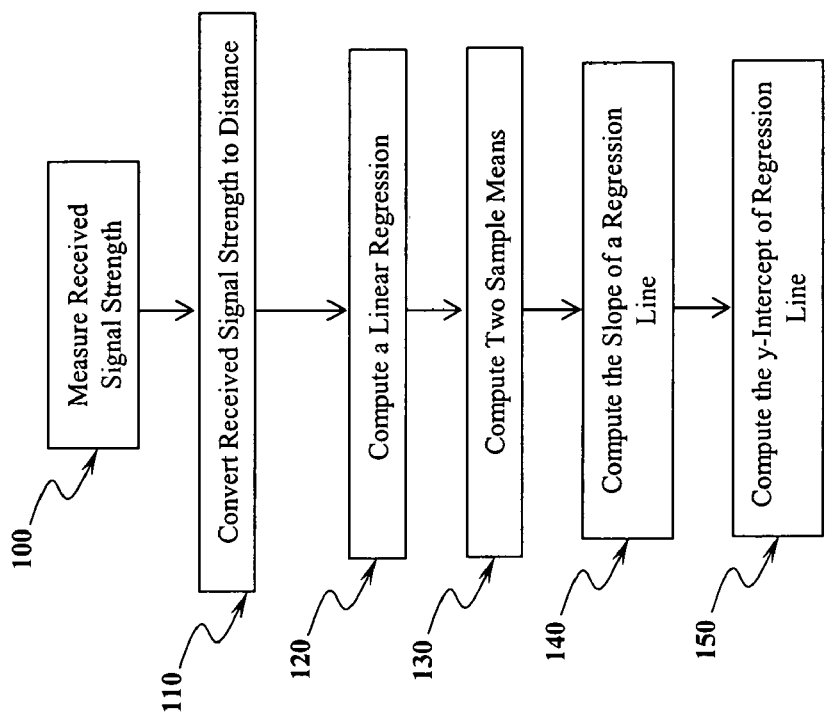

Referring to FIG. 1*a* and FIG. 1*b* depict the results of experiments performed to determine what the RSSI actually measures and to relate that value to an indication of distance. It can be seen that:

a. The RSSI varies roughly linearly with distance, showing that it measures energy (which falls off as 1/distance) rather than power (which falls off as $1/\text{distance}^2$ or inverse-square law) [Smi98, p. 45];

b. A simple linear regression provides a best-fit straight line that is "reasonable fit" to the data. This is significant considering the fact that the data were collected at various distances, orientations, and directions, and also propagated through combinations of free space, cinder block, and framed walls;

c. The linear regression for these data yields a "y=mx+b" form of distance=−0.03655(RSSI)+4.4648 d. Due to the fact that other sets of experiments yielded slightly different m and b coefficients it is recommended that each newly installed WIDS receiver in the present invention be "trained" by gathering a set of RSSIs. The linear regression can in part account for the specific RF environment for that sensor.

The prior art [Aldu04] has experimented extensively with the relationship between RSSI and distance. One set of experiments found that the best-fitting model for the observed data was a $4^{th}$ degree polynomial, but the coefficients for terms with degree greater than one were small compared to that of the linear term that the simple linear fit to the data in the present invention is satisfactory. There is a discrepancy in [Aldu04] in that their $4^{th}$ degree equation does not match the data from which it is derived, nor does it show an inverse relationship between the RSSI and distance although that observation is made in the text of the paper. Inspection of their data indicates that the linear model is an excellent fit for the present invention.

Figure 2A:
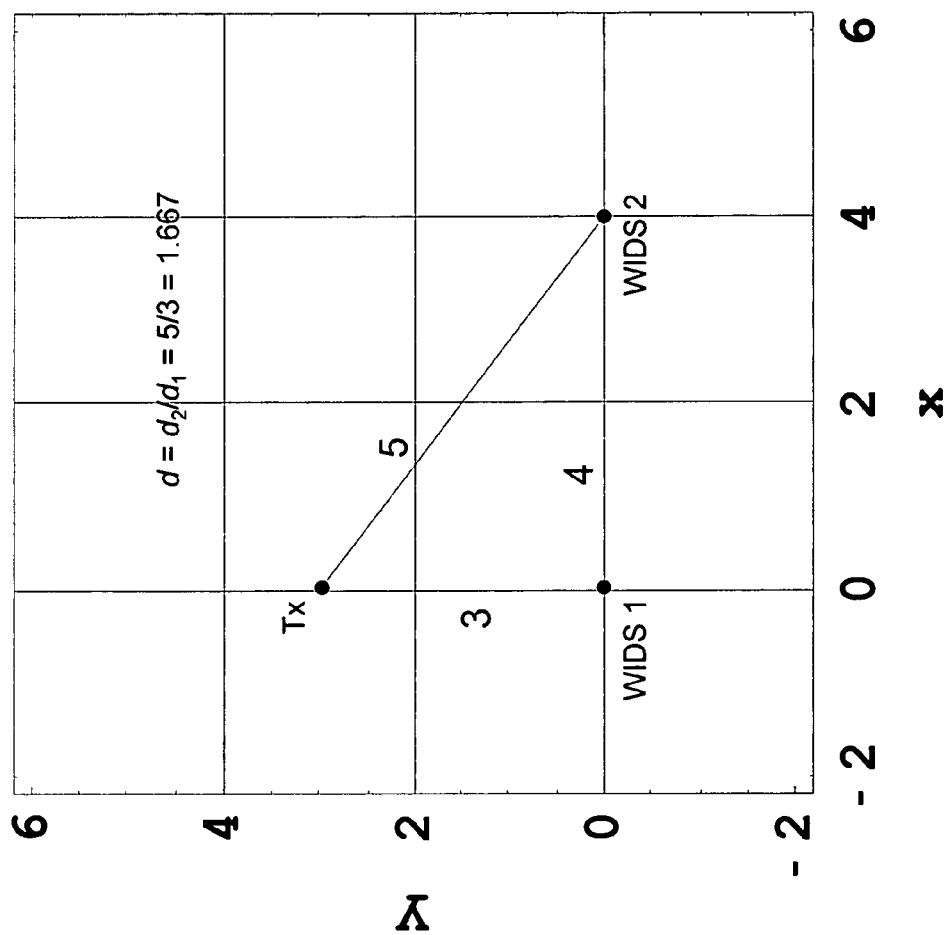
FIG. 2 and FIG. 2b depict two WIDS receivers sighting a rogue transmitter (denoted by "Tx") and the steps to accomplish plotting loci based on relative distance measurements. Relative distances are 3 and 5 units.
Figure 2B:
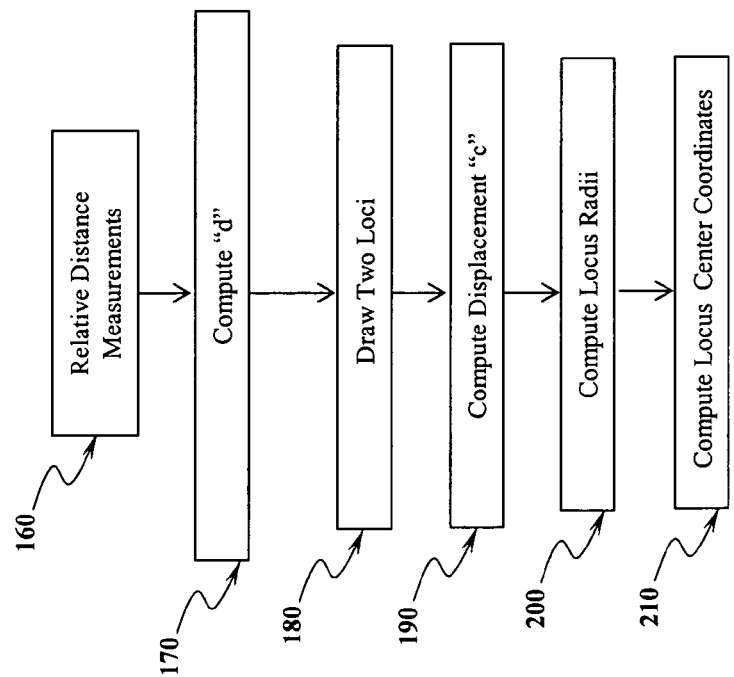

In the present invention linear regression of RSSI versus distance is performed 120 using Microsoft Excel for convenience in graphing the results. Any textbook on statistics (for example, [Men73, p. 381]) gives the equations for this process. n RSSI values are denoted by $x_i$ and the corresponding distance values are denoted as $y_i$. Two sample means $$\bar{x} = \sum_{i=1}^{n} x_i = \sum x_i$$

and $\bar{y}=\Sigma y_i$ are obtained 130. Then the slope of the regression line (for distance as a function of RSSI) is computed 140 as $$m = \frac{\sum x_i y_i - n\bar{x}\bar{y}}{\sum x^2 - n\bar{x}^2}$$

and the y-intercept (or, in this case, the distance axis intercept) is computed 150 as $b=\bar{y}-m\bar{x}$ Referring to FIG. 2*a* and FIG. 2*b*, the result achieved when two WIDS receivers in the present invention are used to make a pair of relative distance measurements 160 to a rogue transmitter, is depicted.

The best that can be achieved by measuring RSSI when rogue transmitter characteristics and RF propagation conditions are unknown is to make a relative distance estimate. Specifically, in the present invention $d_1$ and $d_2$ represent the estimated distances from a rogue transmitter to WIDS receiver #1 and WIDS receiver #2, respectively, where the scale of the distance measurement is assumed to be linear with zero offset, but otherwise unknown. The relative distance "d" is then computed as $d=d_2/d_1$ 170. The location of WIDS receiver #1 is denoted as $(x_1, y_1)$ and the location of WIDS receiver #2 is denoted as $(x_2, y_2)$. The location of the rogue transmitter must lie on the locus of points that satisfy $d=d_2/d_1$. It can be shown that the locus of points is a circle, or, in the special case where d=1, the locus of points is a line. To simplify calculations when d=1, d=1.00001 is used instead, resulting in a circle with a very large radius which closely approximates a straight line in the region of interest.

Note that, if the actual distances $d_1$ and $d_2$ are known then two circles can be drawn 180: one centered at $(x_1, y_1)$ with radius $d_1$ and the other at $(x_2, y_2)$ with radius $d_2$. In such a situation the ambiguity of the location of the rogue transmitter would have been narrowed to just two points—the intersection of the two circles. In this case, however, the reduction of knowledge results in the ambiguity of location being all the points on a circle.

In the present invention, the circle is not centered on a WIDS receiver. Rather, it is centered at some displacement, c, from WIDS receiver #1 along a line joining the two WIDS receivers. The value of c is measured with respect to WIDS receiver #1 because the relative distance was defined as $d=d_2/d_1$ rather than as $d_1/d_2$. Denoting as D the distance between the two WIDS receivers, where $D=\sqrt{(x_c-x_1)^2+(y_2-y_1)^2}$. Then the value of c is computed 190 as $$c = \frac{D}{2}\left[\frac{1}{1+d} + \frac{1}{1-d}\right]$$

and the radius of the locus circle is computed 200 as $$r = \left|\frac{D}{2}\left[\frac{1}{1+d} + \frac{1}{1-d}\right]\right|$$

The coordinates of the center of the locus circle are the point $P=(x_c, y_c)$, whose coordinates are computed 210 as $$x_c = x_1 + \frac{c}{D}(x_2 - x_1)$$

$$y_c = y_1 + \frac{c}{D}(y_2 - y_1)$$

For example, consider the case where WIDS receiver #1 is at (0, 0), WIDS receiver #2 is at (4, 0), and the (usually unknown) position of the rogue transmitter is (0, 3). The rogue transmitters are denoted as "Tx" in FIG. 2a. This configuration conveniently forms a 3-4-5 right triangle, where $d=d_2/d_1=5/3=1.667$, which is the only information the WIDS system is allowed to know about the rogue transmitter.

Figure 3:
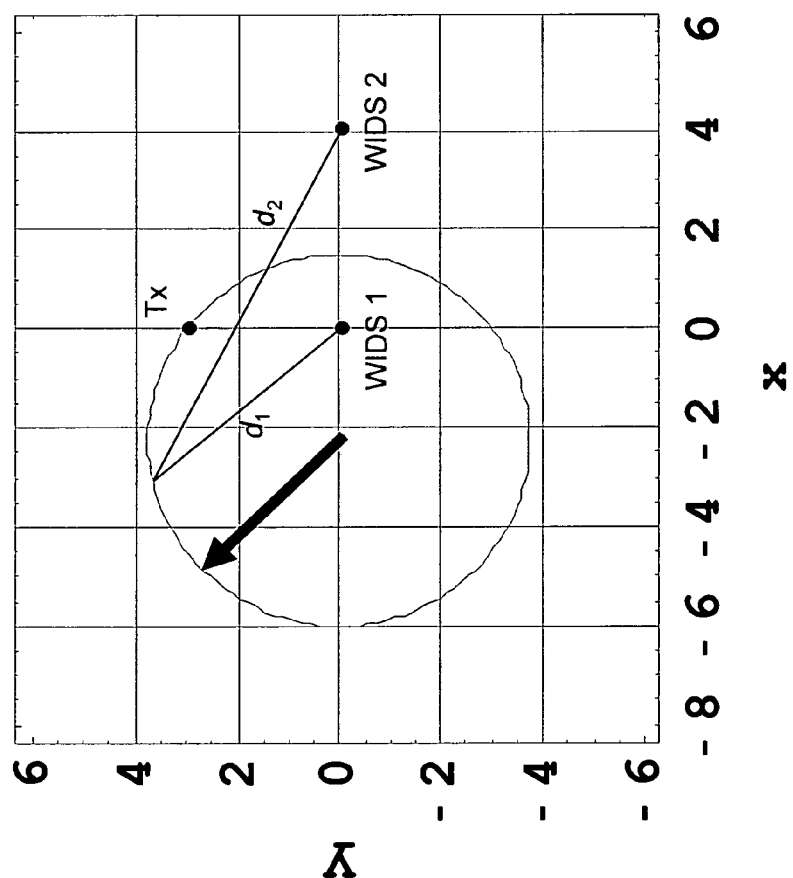
FIG. 3 depicts the locus of points that satisfy d=d2/d1=5/3=1.667. Center of circle is at (-2.24, 0), with radius 3.75 (see arrow).

Referring to FIG. 3 shows the circle resulting from the equations for $(x_c, y_c)$ and r, which clearly contains the point (0, 3) where the rogue transmitter is located.

Figure 4:
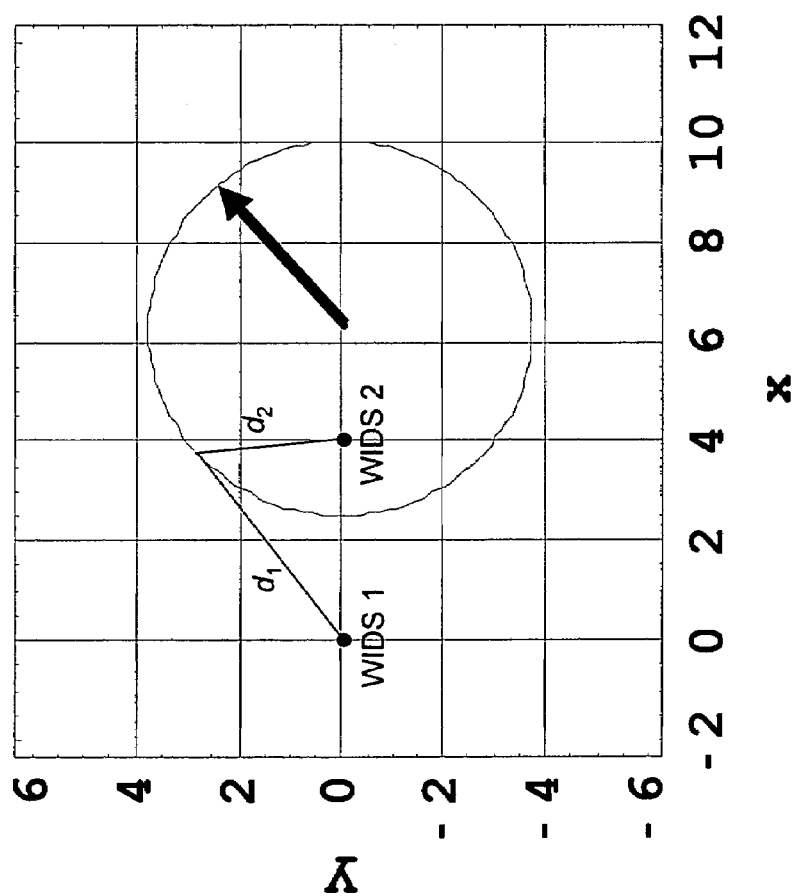
FIG. 4 depicts the locus of points that satisfy d=d2/d1=3/5=0.6. Center of circle is at (6.25, 0), with radius 3.75 (see arrow).

Referring to FIG. 4 shows the result when the relative distances are the same as in the previous example, but the relationship is reversed, i.e., the rogue transmitter is closer to WIDS receiver #2.

Figure 5:
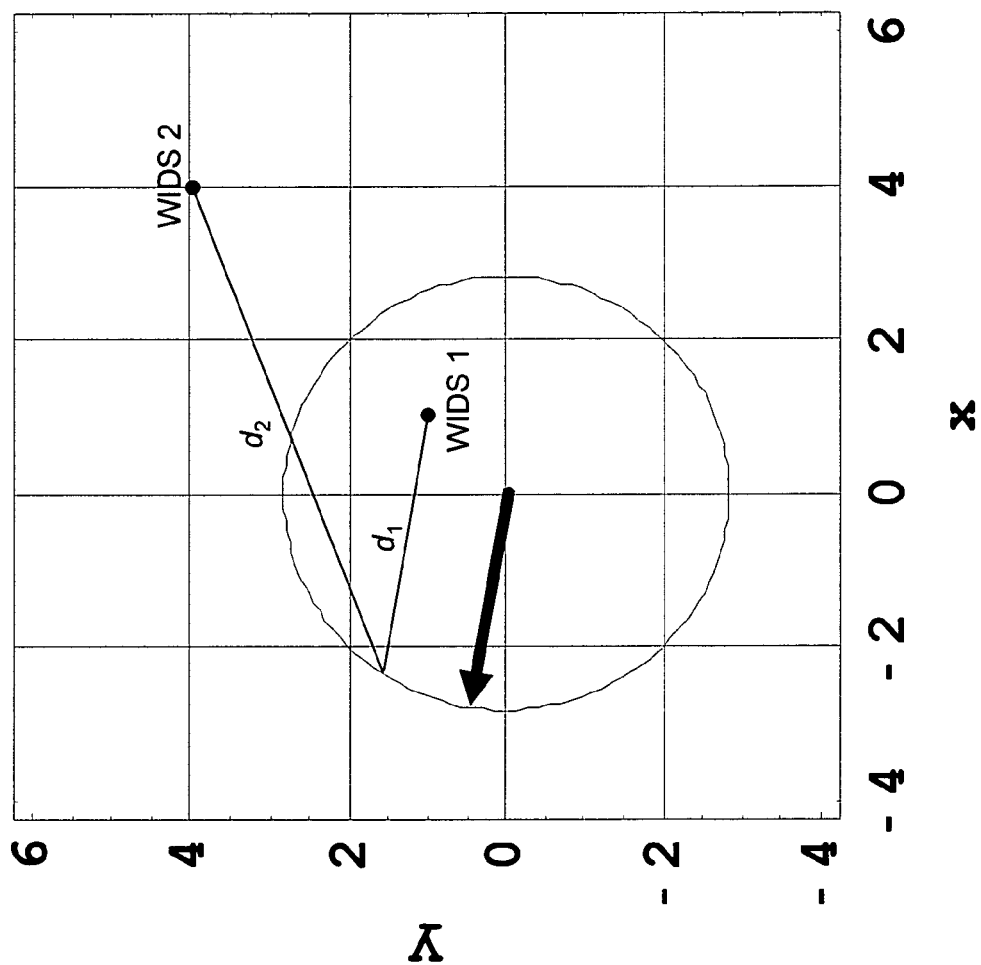
FIG. 5 depicts the locus of points that satisfy d=d2/d1=2 for WIDS #1 at (1, 1) and WIDS #2 at (4, 4).

Referring to FIG. 5 shows yet another example. The WIDS receiver #1 and #2 locations are (1, 1) and (4, 4), respectively, with relative distance $d=d_2/d_1=2$.

Therefore, two RSSIs from a pair of sightings of a rogue transmitter by WIDS receivers, which produces a single relative distance measurement, yields a circle as the locus of points that satisfy that relative distance relationship. However, if a third sighting is made, three pairs of relative distances can be calculated from the three RSSIs, resulting in three circles. Three intersecting circles, however, do not yield one point of intersection because the three circles are not independent and an interesting but frustrating relationship emerges.

Figure 6:
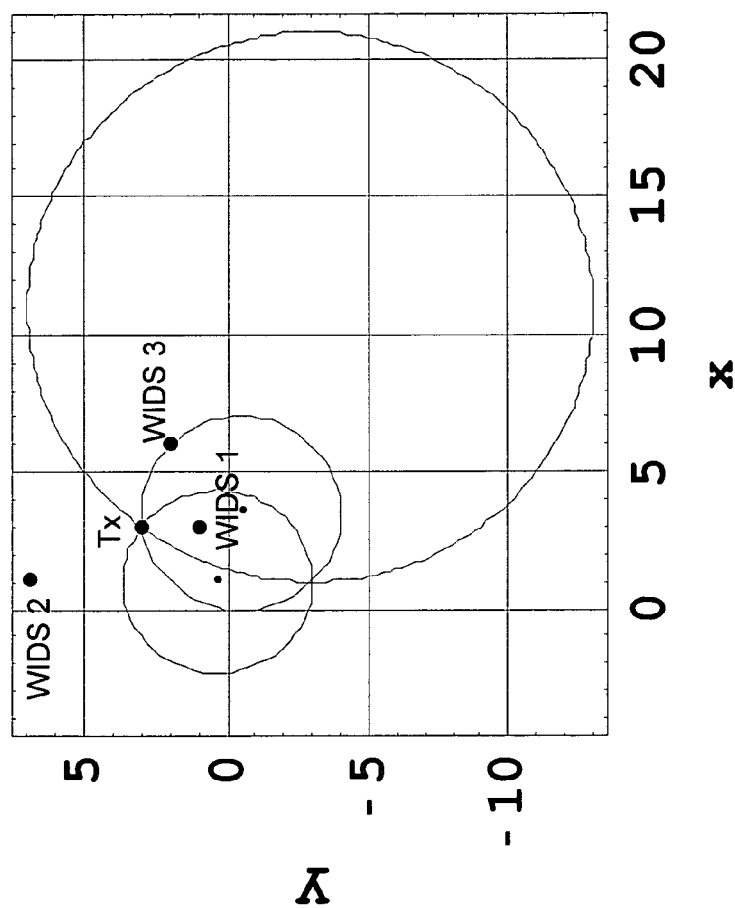
FIG. 6 depicts three sightings resulting in two possible solutions for target transmitter.
Figure 7:
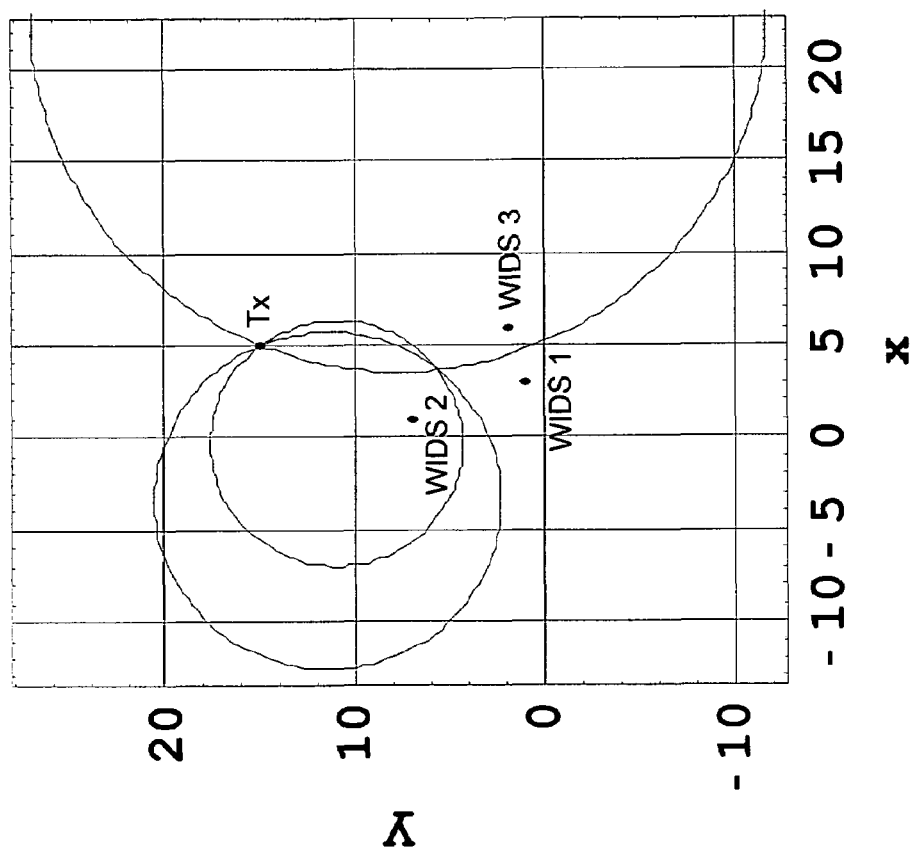
FIG. 7 depicts another configuration with three sightings that result in two possible solutions for target transmitter.

Referring to FIG. 6 and FIG. 7 depicts the problem with only three sightings being that there are two possible locations of the rogue transmitter.

Figure 8:
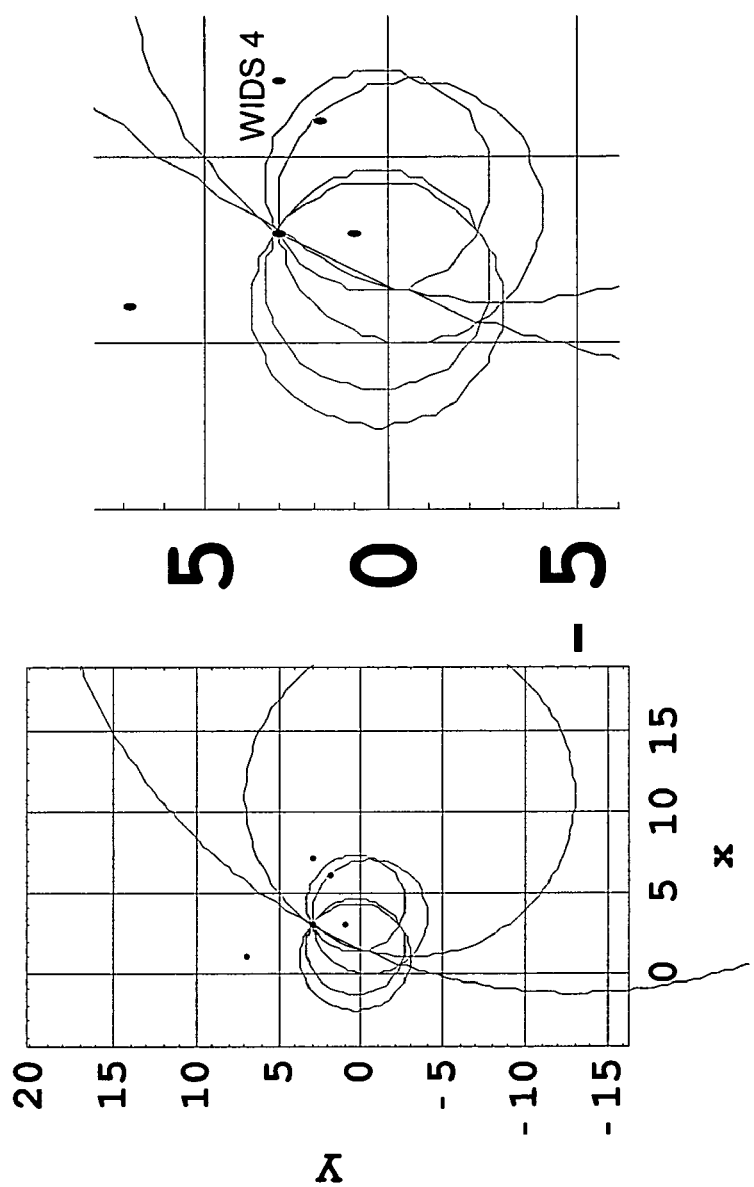
FIG. 8 depicts that adding a fourth WIDS sighting to the configuration shown in FIG. 6 results in a single solution for target location. See blow-up of area of interest.
Figure 9:
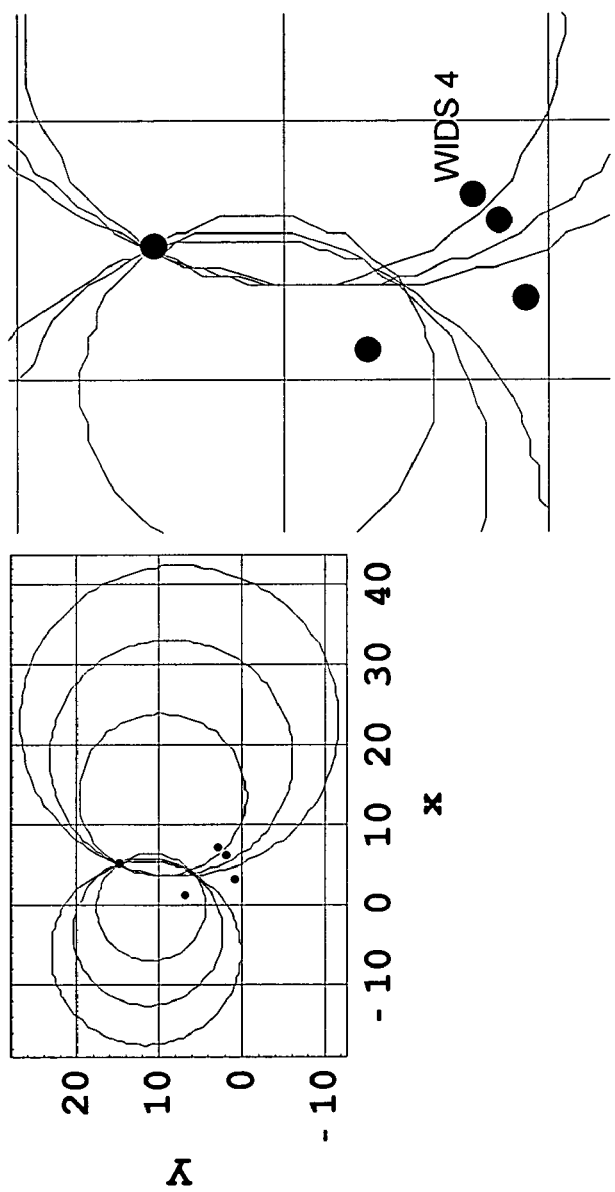
FIG. 9 depicts that adding a fourth WIDS sighting to the configuration shown in FIG. 7 results in a single solution for target location. See blow-up of area of interest.

In the preferred embodiment of the present invention it is necessary to have a minimum of four sightings. Referring to FIG. 8 and FIG. 9, adding a fourth sighting to the examples shown in FIG. 6 and FIG. 7 enables unique solutions. The need for the fourth sighting when relative distances are used instead of absolute distances is analogous to the problem in statistics when a "degree of freedom" is lost for each linear dependency in a relationship. By analogy, the Global Positioning System (GPS), which measures absolute distances instead of the weaker relative distances in the present invention, requires a minimum of four satellite sightings with additional sightings being even better. Clearly, this limitation of the present invention is not unprecedented among geolocation systems.

Still referring to FIG. 8 and FIG. 9 it is noted that half of the intersections between pairs of circles fall on the desired location of the rogue transmitter.

Figure 10:
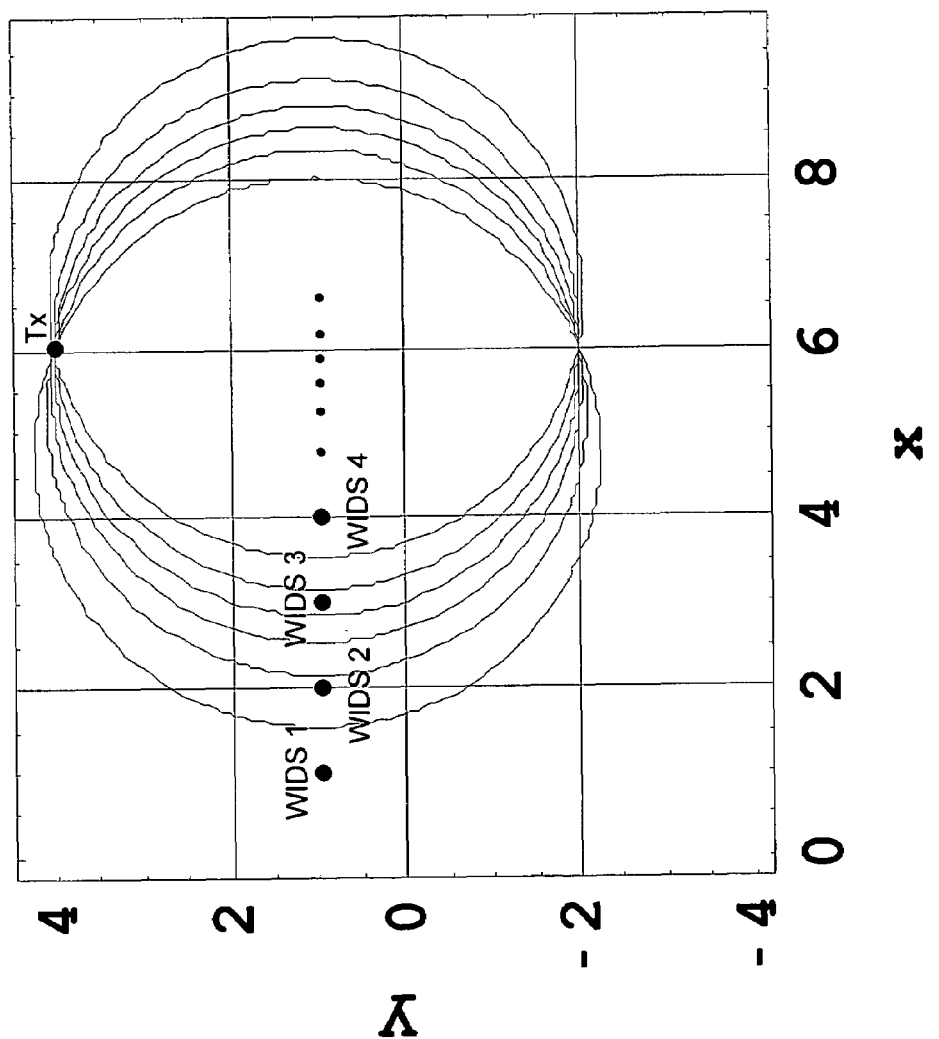
FIG. 10 depicts how collinear placement of four WIDS receivers results in two possible solutions.

Referring to FIG. 10, it is shown that notwithstanding four sightings, it is critical to ensure that collinear placement of WIDS receivers is avoided, because if the four WIDS receivers lie on a straight line two solutions are obtained rather than the unambiguous unique solution. Having three collinear WIDS receivers in the present invention is acceptable. The problem arises when there are four collinear receivers. While it was already discussed that it is recommended that more than four sightings be used to reduce errors due to actual RSSI measurements, this may prove to be difficult to achieve with practical densities of deployed WIDS receivers, but, at the very least, non-collinear placement of any four WIDS receivers of the present invention should be avoided so as not to waste any opportunity to geolocate accurately to a single, unambiguous point. The characteristics of the intersecting circles graphically depicted. The numerical solutions of their two intersections must be found.

Given two circles specified by their center points and radii:

Circle 1: Center point $P_1=(x_{c1}, y_{c1})$, radius $r_1$

Circle 2: Center point $P_2=(x_{c2}, y_{c2})$, radius $r_2$ their two points of intersection is obtained:

$P_3=(x_3, y_3)$ $P_4=(x_4, y_4)$

Figure 11A:
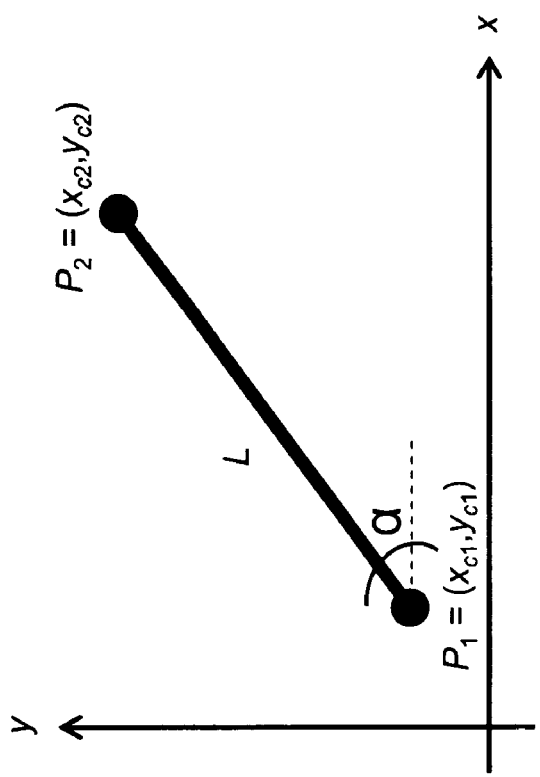
FIG. 11*a* and FIG. 11*b* depict the distance and angle relationship between two circle center points P1 and P2 and the steps to compute the Euclidean distance therebetween. The circles have radii r1 and r2, respectively (not shown).
Figure 11B:
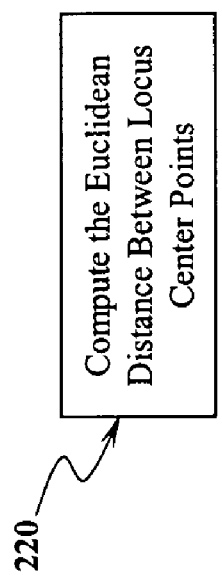

Referring to FIG. 11a and FIG. 11b, L is the Euclidean distance between two center points $P_1$ and $P_2$, where L is computed as 220

$$L = \sqrt{(x_{c2} - x_{c1})^2 + (y_{c2} - y_{c1})^2},$$

Intermediate Points of Intersection

Figure 12A:
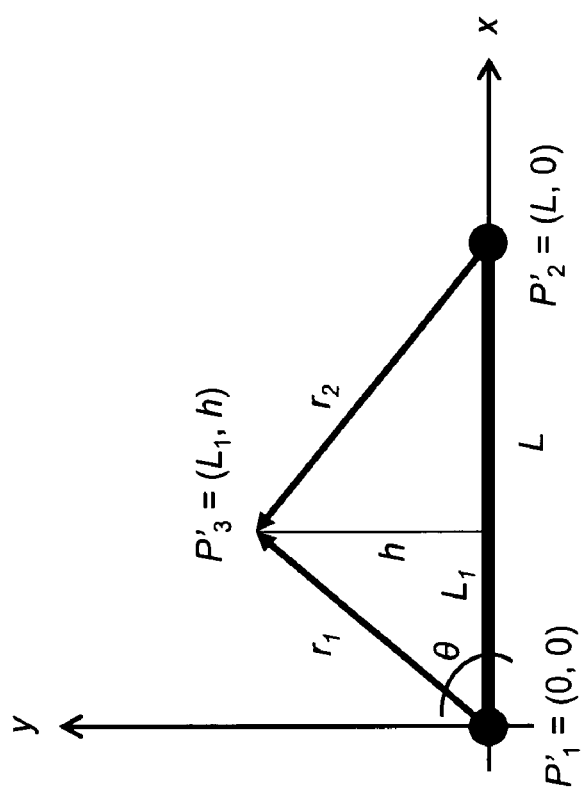
FIG. 12*a* and FIG. 12*b* depict the translation and rotation of the two circle center points P1 and P2 to new points P'1 and P'2. Point P'3 is at distance r1 from P'1 and distance r2 from P'2 and the steps to accomplish the same. (Second point P'4 that satisfies this condition is not shown.)
Figure 12B:
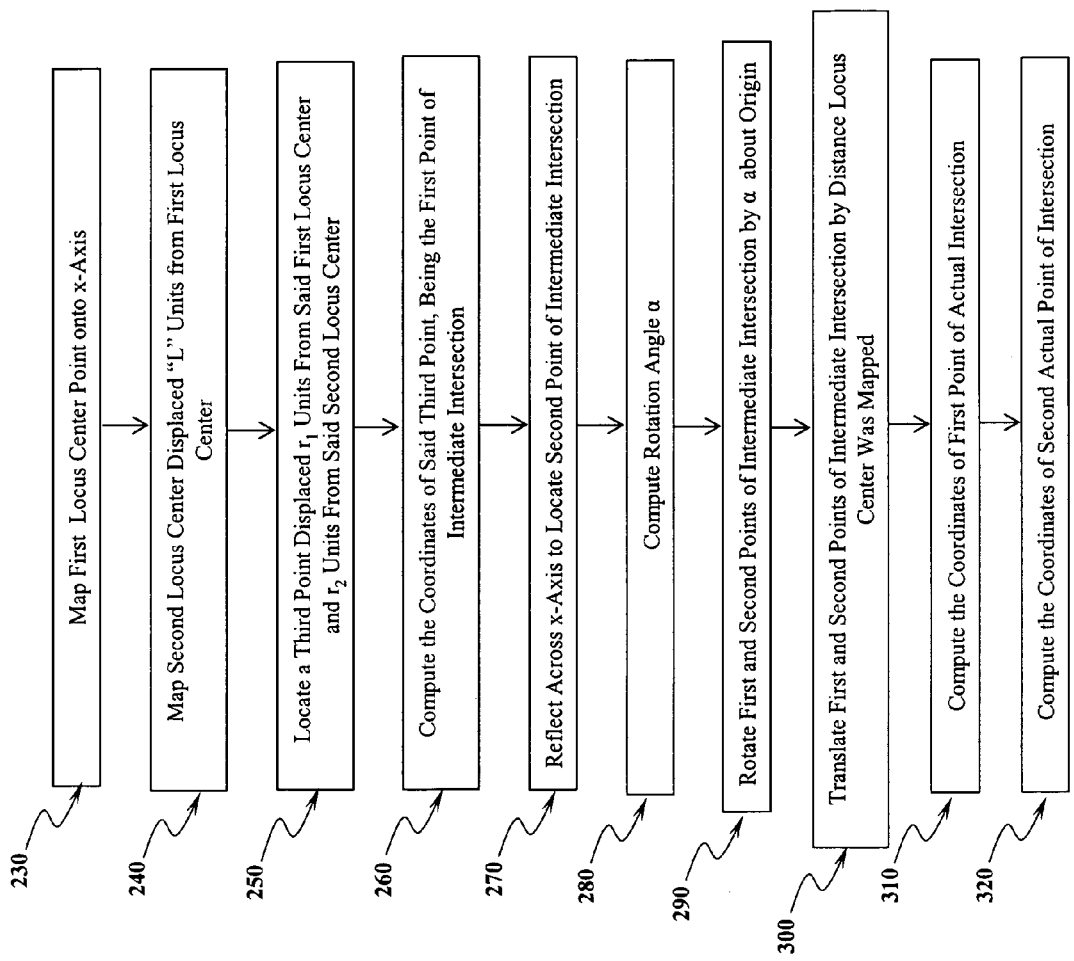

Referring to FIG. 12a and FIG. 12b, points $P_1$ and $P_2$ are mapped on to the x-axis of the coordinate system as the two new points $P'_1 = (0, 0)$ and $P'_2 = (L, 0)$ 230, 240. Point $P'_3$ is found 250 at the apex of the triangle with base length L and sides of length $r_1$ and $r_2$ (the radii of the two circles). The coordinates of this point are denoted as $P'_3 = (L_1, h)$. $L_1$ and h can be solved for because from the Law of Cosines it can be shown that $$\cos\theta = \frac{L^2 + r_1 - r_2^2}{2Lr_1}$$

Therefore $L_1$ and h, the coordinates of $P'_3$ are computed 260 as $$L_1 = r_1 \cos\theta \quad h = r_1 \sin\theta$$

At this point the coordinates of one intersection have been found. The other intersection is $P'_4$, which is found by the reflecting $P'_3$ across the x-axis 270 and is given by $P'_4 = (L_1, -h)$ (not shown in FIG. 12a).

The two solutions, $P'_3$ and $P'_4$, are based on the two center points $P'_1$ and $P'_2$ that were mapped on to the x-axis. It remains to rotate and translate these two values to obtain the actual solutions for the intersections: $P_3$ and $P_4$.

Actual Points of Intersection

Circle center $P_1$ was mapped specifically to point $P'_1$ at the origin to facilitate the rotation and translation operations. This must now be accounted for to find the actual points of intersection. Letting α denote the counterclockwise angle that $P_2$ makes with $P_1$ with respect to the x-axis (see FIG. 11a). Then the sin and cosine of α are computed 280 as $$\sin\alpha = \frac{y_{c2} - y_{c1}}{L}$$

$$\cos\alpha = \frac{x_{c2} - x_{c1}}{L}$$

It is necessary first to rotate 290 $P'_3$ and $P'_4$ with respect to $P'_1$ by angle α, and then to translate 300 by the displacement of $P'_1$ from $P_1$. These two operations can be accomplished in a single step [Spi68, p. 36] to compute the coordinates 310 of $P_3 = (x_3, y_3)$ from $P'_3 = (L_1, h)$, as follows:

$$x_3 = L_1 \cos\alpha - h \sin\alpha + x_{c1}$$

$$y_3 = h \cos\alpha + L_1 \sin\alpha + y_{c1}$$

The coordinates of the other point of intersection, $P_4 = (x_4, y_4)$ are similarly computed 320 from $P'_4 = (L_1, -h)$.

Figure 13A:
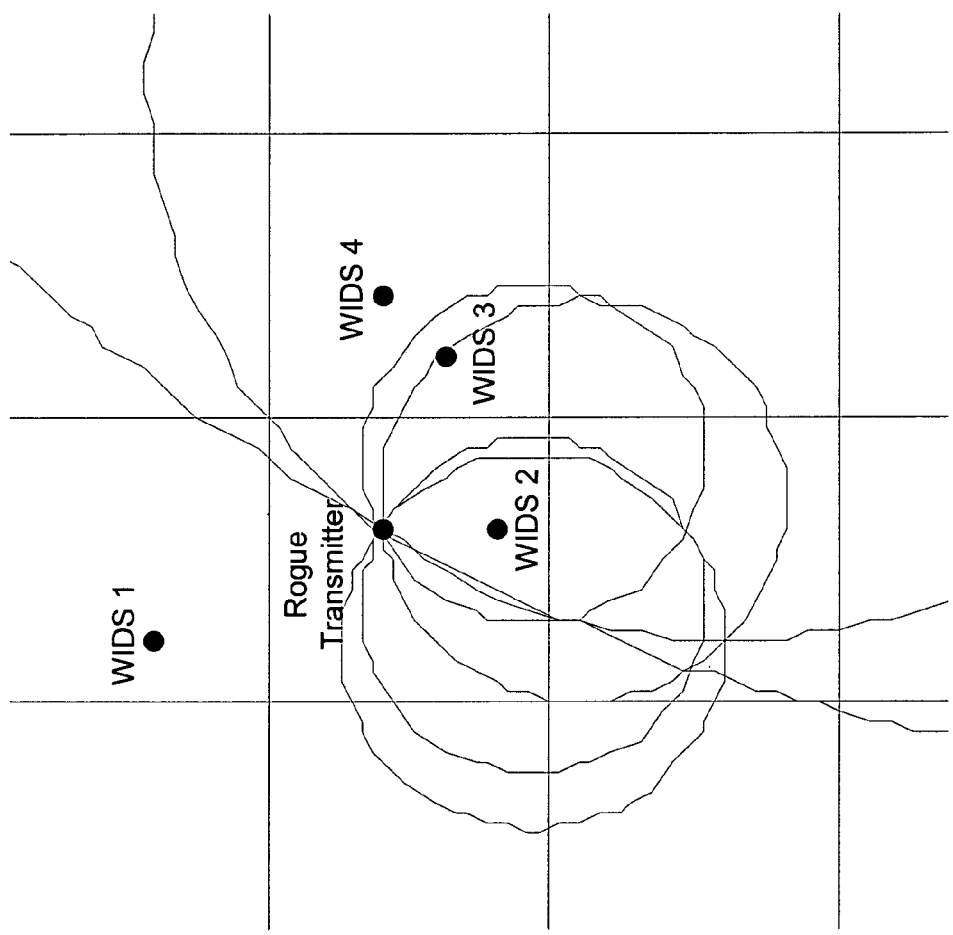
FIG. 13*a* and FIG. 13*b* depict four WIDS sighting resulting in a single solution for target location and the steps to determine the number of possible loci and intersections given the number of WIDS receivers.
Figure 13B:
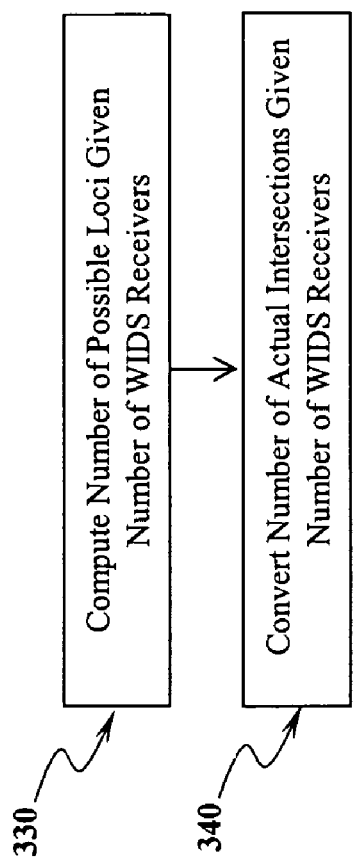

Referring to FIG. 13a and FIG. 13b, it is depicted how in the present invention each pair of WIDS sightings yields one relative distance estimate, which yields one circle (specified as a center point P and radius r). Each pair of these resulting circles (specified as $P_1, r_1$ and $P_2, r_2$) yields a pair of intersections, $P_3$ and $P_4$. A minimum of four non-collinear WIDS sightings are required to obtain a unique solution.

N represents the number of WIDS receivers that have sighted a rogue transmitter, and M represents the number of circles that result, and I represents the number of intersections. Therefore, since each pair of WIDS receivers create a circle, the number of resulting locus circles is computed 330 as $$M = \binom{N}{2} = \frac{N^2 - N}{2}$$

and since each pair of circles have two intersections, the number of intersections between locus circles is computed 340 as $$I = 2\binom{M}{2} = M^2 - M = \frac{N^4}{4} - \frac{N^3}{2} - \frac{N^2}{4} + \frac{N}{2}$$

In practice the present invention will not generally yield fourth order or higher expressions for I since the number of receivers N is limited to those that simultaneously determine a RSSI for a given rogue transmitter.

Figure 14:
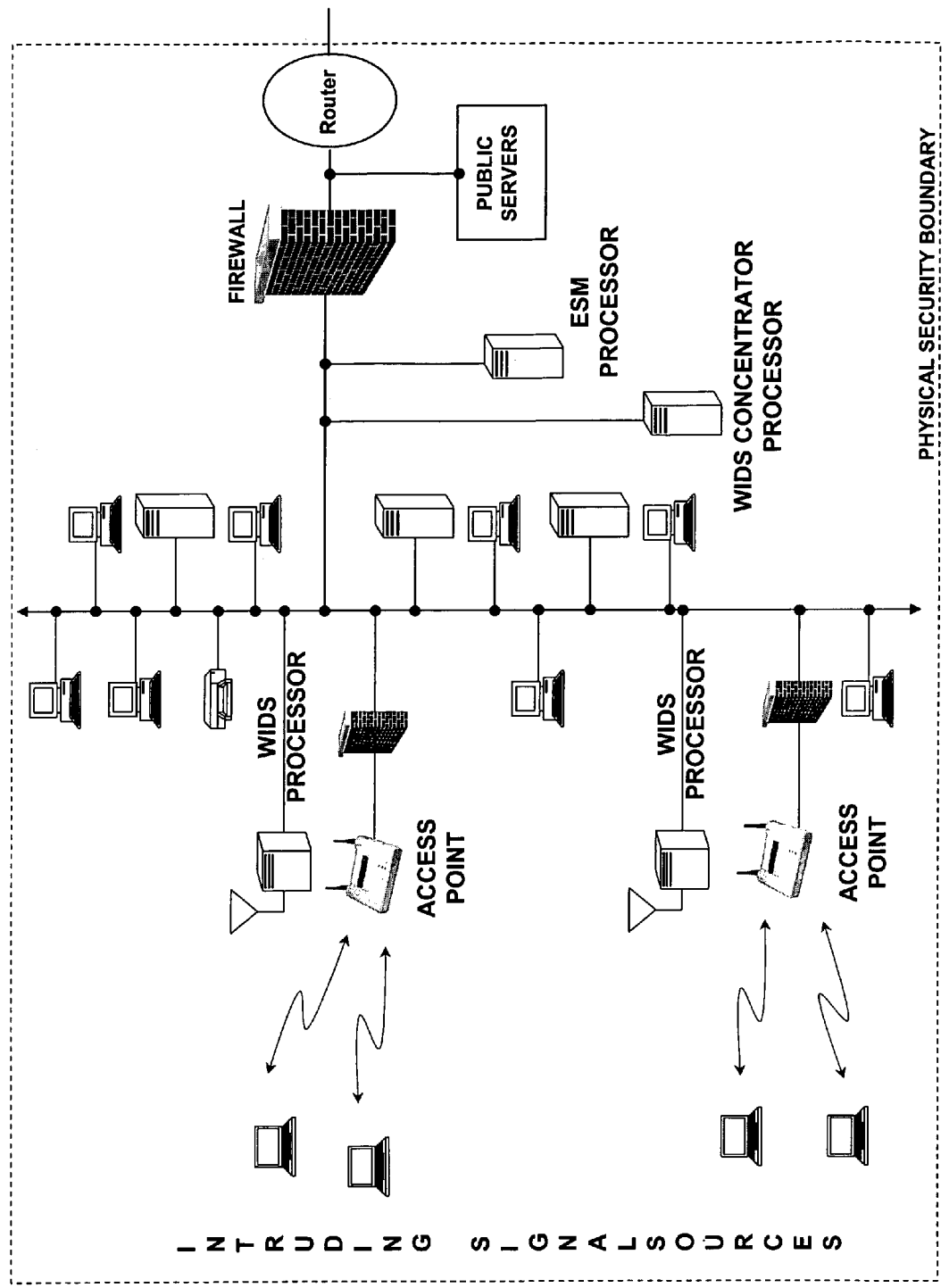
FIG. 14 depicts the elements of the present invention deployed so as to protect a network from intrusion by intruding signal sources at wireless access points.

Referring to FIG. 14 the elements of the present invention comprising the plurality of wireless intrusion detection processors, the enterprise security management (ESM) processor and the wireless intrusion detection concentrator processor are depicted deployed so as to detect intrusion by signal sources, either standalone, or those that are transmitting into wireless access points.

Figure 15:
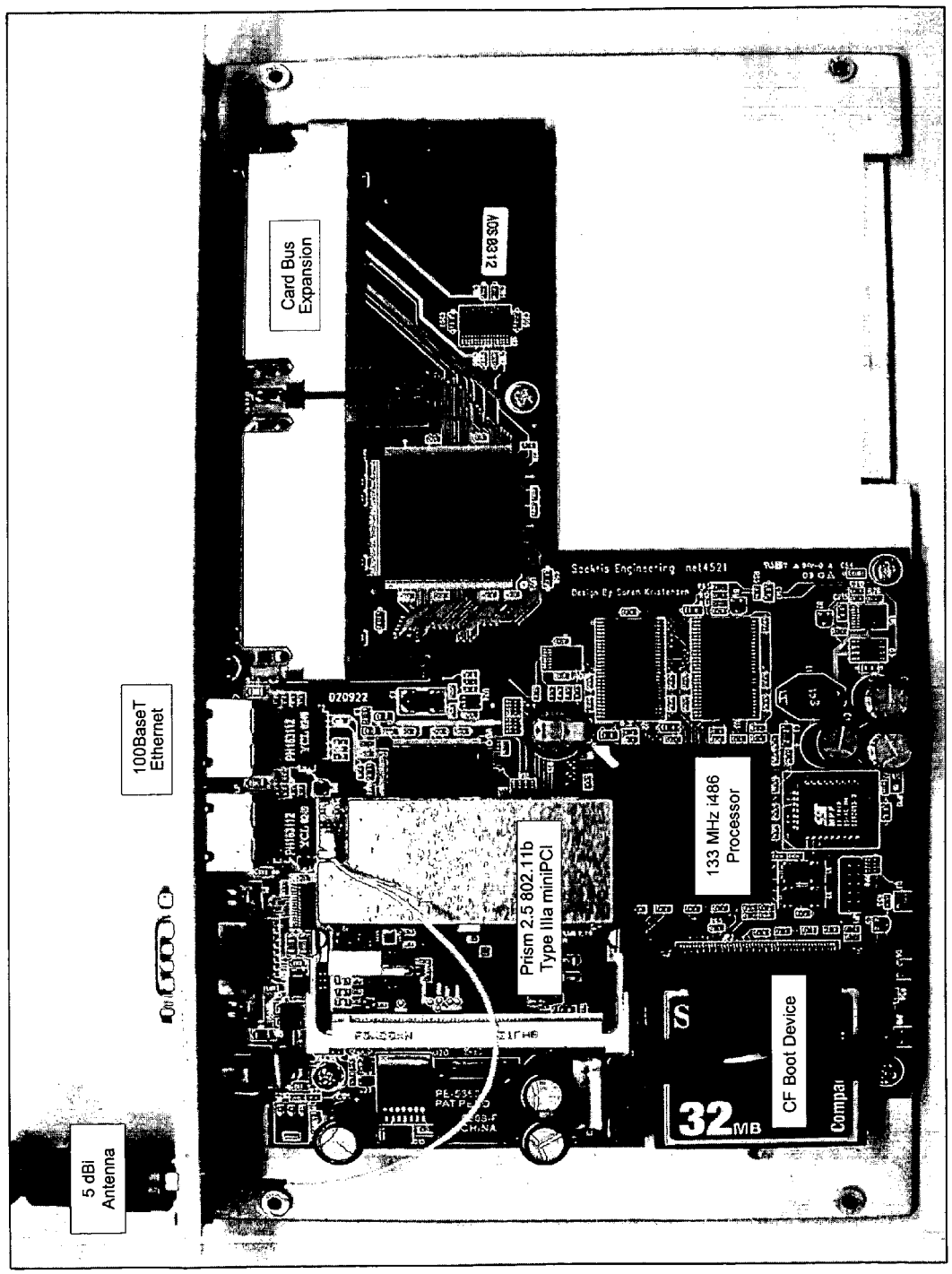
FIG. 15 depicts subcomponents of an exemplary wireless intrusion detection sensor embodiment of the present invention.

Referring to FIG. 15 photographically shows the subcomponents of an exemplary wireless intrusion detection sensor embodiment.

Figure 16:
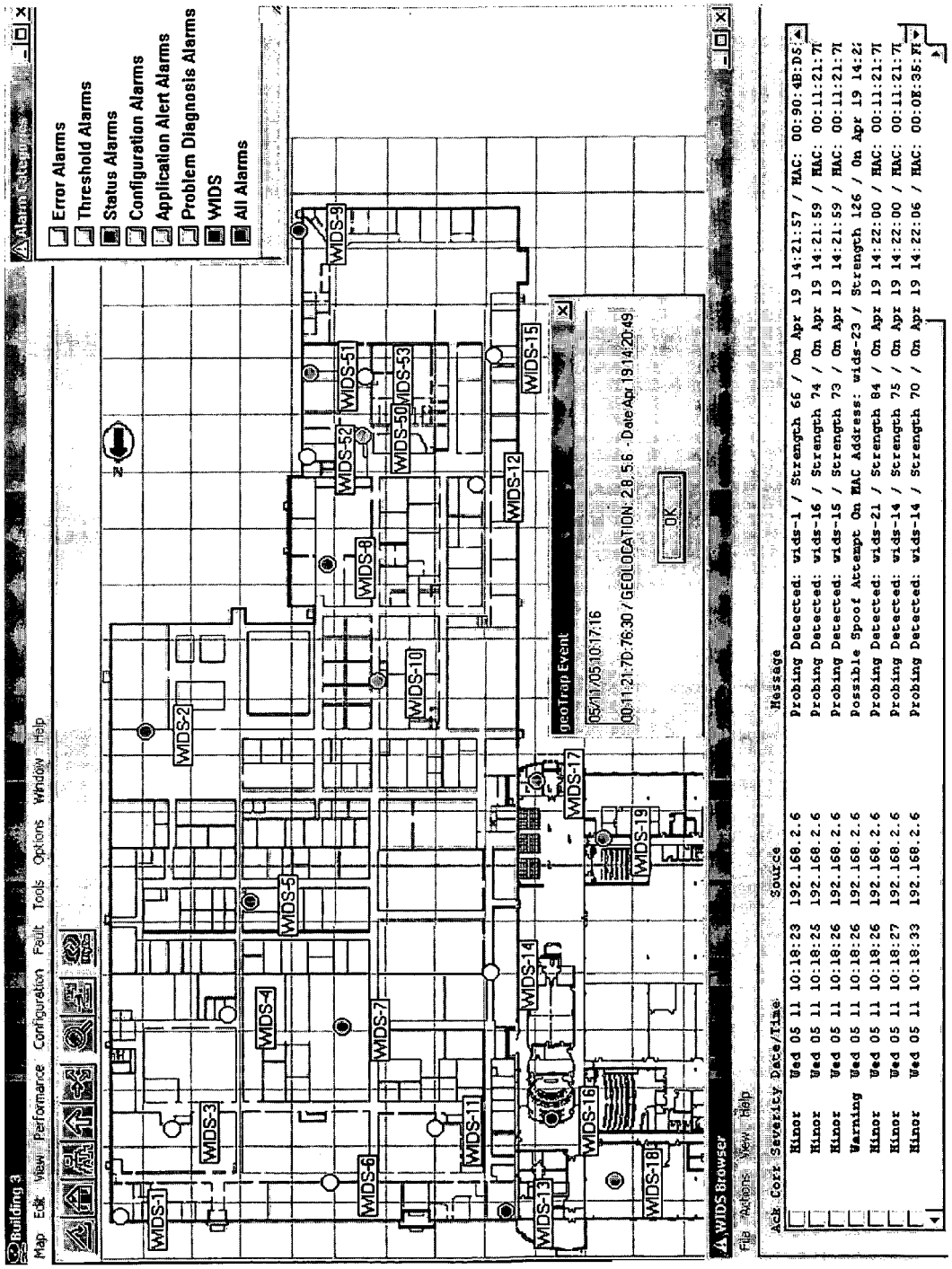
FIG. 16 depicts a physical deployment of a plurality of wireless intrusion detection processors in a building environment.

Referring to FIG. 16, a deployment of wireless intrusion detection processor of the present invention is shown in a building. Hewlett Packard OpenView® software is utilized in the enterprise security management (ESM) processor to log all intrusion events by time, location, signal strength and severity.

Having described preferred embodiments of the invention with reference to the accompanying drawings, it is to be understood that the invention is not limited to those precise embodiments, and that various changes and modifications may be effected therein by ones skilled in the art without departing from the scope or spirit of the invention as defined in the appended claims.

What is claimed is:

1. Method for detecting and locating intrusion in a wireless network, comprising the steps of:
   receiving an intruding radio frequency signal by a plurality of receivers;
   measuring the received signal strength $R_i$ on each of said plurality of receivers;
   for each paired combination of said plurality of receivers, computing one relative distance measurement d to the location of said transmitting source,
      said one relative distance measurement d being a function of said received signal strength $R_i$ of each said receiver in each said paired combination;

for each paired combination of said plurality of receivers, computing the possible locations of said transmitting source lying on the locus of points satisfying $d=[R_1/R_2]^{1/2}$;

further comprising;
  computing the displacement c of the center of said locus from the first receiver in each said paired combination;
  computing the radius r of said locus;
  and,
  computing the point about which said locus is centered;
computing the intermediate points of intersection of all said loci corresponding to all said paired combinations; and
computing the actual points of intersection from said intermediate points of intersection of all said loci of points so as to determine an unambiguous location of said transmitting source.

2. The step of computing intermediate points of intersection of all said loci of points of claim 1, further comprising
  computing the $j^{th}$ intermediate point of intersection by
    computing the Euclidian distance L between the center points of each of said loci of points according to $L=\sqrt{(x_{c2}-x_{c1})^2+(y_{c2}-y_{c1})^2}$ wherein $(x_{c1}, y_{c1})$ and $(x_{c2}, y_{c2})$ are the coordinates of the centers of an $i^{th}$ said locus of points having a radius $r_1$ and an $i^{th}+1$ said locus of points having a radius $r_2$, respectively;
    mapping said $i^{th}$ locus center point onto the origin of x-y coordinate system and mapping said $i^{th}+1$ locus center point onto the x-axis of said coordinate system at a displacement L units along said x-axis from said $i^{th}$ locus center point;
    locating a third point within the first quadrant of said coordinate system, said third point being
      displaced $r_1$ units from said first locus center point and $r_2$ units from said second locus center point so as to form the apex of a right triangle having base length $L_1$ and height h; and
      displaced θ units from said x-axis, counterclockwise about the origin;
      so as to cause said third point to coincide with the coordinate $(L_1, h)$.

3. Method of claim 2, further comprising the step of computing said base length $L_1$ according to $L_1=r_1 \cos θ-$.

4. Method of claim 2, further comprising the step of computing said height of said apex according to $h=r_1 \sin θ$.

5. Method of claim 2, further comprising computing the $j^{th}+1$ intermediate point of intersection by
  reflecting said $j^{th}$ intermediate point of intersection across the x-axis such that the coordinates of said $j^{th}+1$ intermediate point of intersection coincide with $(L_1, -h)$.

6. Method of claim 2, further comprising computing the $k^{th}$ actual point of intersection by
  computing the counter clockwise angular displacement α of the center point of the $i^{th}+1$ said locus from the x-axis about the origin according to $\sin α = \frac{y_{c2}-y_{c1}}{L}$ $\cos α = \frac{x_{c2}-x_{c1}}{L}$ rotating said $j^{th}$ intermediate point of intersection by a units with respect to said $i^{th}$ locus center point;
  translating said rotated $j^{th}$ intermediate point of intersection by a number of units equivalent to the displacement of said mapped $i^{th}$ locus center point from said $i^{th}$ locus center point; and
  computing the coordinates $(x_3, y_3)$ of said translated and rotated $j^{th}$ intermediate point of intersection according to $x_3=L_1 \cos α - h \sin α + x_{c1}$ $y_3=h \cos α + L_1 \sin α + y_{c1}$ said coordinates $(x_3, y_3)$ being the location of said $k^{th}$ actual point of intersection.

7. Method of claim 2, further comprising computing the $k^{th}+1$ actual point of intersection by
  computing the counter clockwise angular displacement α of the center point of the $i^{th}+1$ said locus from the x-axis about the origin according to $\sin α = \frac{y_{c2}-y_{c1}}{L}$ $\cos α = \frac{x_{c2}-x_{c1}}{L}$ rotating said $j^{th}+1$ intermediate point of intersection by a units with respect to said $i^{th}$ locus center point;
  translating said rotated $j^{th}+1$ intermediate point of intersection by a number of units equivalent to the displacement of said mapped $i^{th}$ locus center point from said $i^{th}$ locus center point; and
  computing the coordinates $(x_4, y_4)$ of said translated and rotated $j^{th}+1$ intermediate point of intersection according to $x_4=L_1 \cos α - h \sin α + x_{c1}$ $y_4=h \cos α + L_1 \sin α + y_{c1}$ said coordinates $(x_4, y_4)$ being the location of said $k^{th}+1$ actual point of intersection.

8. Method of claim 1, further comprising computing the number of said loci M according to $M = \binom{N}{2} = \frac{N^2-N}{2}$ wherein N represents the number of said receivers.

9. Method of claim 8, further comprising computing the number of intersections I between said loci according to $$I = 2\binom{M}{2} = M^2 - M = \frac{N^4}{4} - \frac{N^3}{2} - \frac{N^2}{4} + \frac{N}{2}.$$

10. Method of claim 1 further comprising the step of computing a linear regression of received signal strength $R_i$ versus distance.

11. Method of claim 1 wherein said step of determining an unambiguous location of said transmitting source further comprising computing a clustering algorithm, said step of computing further comprising computing the mean of the remaining actual points of intersection;

selecting said computed mean as the cluster center;

eliminating from the said cluster that actual point of intersection being furthest from said cluster center;

determining whether one-half of the original points of intersection have been eliminated;

IF one-half of the original points of intersection have NOT been eliminated,

THEN, returning to said step of computing the mean of the remaining actual points of intersection;

OTHERWISE, locating said transmitting source coincident with current said cluster center.

12. Method of claim 1, where, in said step of computing said radius r, r is computed according to $$r = \left| \frac{D}{2} \left[ \frac{1}{1+d} - \frac{1}{1-d} \right] \right|.$$

13. Method of claim 1, where, in said step of computing the displacement c, c is computed according to $$c = \frac{D}{2} \left[ \frac{1}{1+d} + \frac{1}{1-d} \right]$$

wherein D is the distance between said receivers in each said paired combination.

14. Method of claim 1, where, in said step of computing the point about which said locus is centered, the coordinates ($x_c$, $y_c$) represent said point and further satisfy $$x_c = x_1 + \frac{c}{D}(x_2 - x_1)$$

$$y_c = y_1 + \frac{c}{D}(y_2 - y_1)$$

wherein ($x_1, y_1$) and ($x_2, y_2$) are the coordinates of the first and the second said receivers in each said paired combination, respectively.

15. An apparatus for detecting and locating intrusion in a wireless network, comprising:

a computer processor;

a plurality of radio frequency receivers;

a means for each of said plurality of said radio frequency receivers to communicate a received signal strength indication (RSSI) with said computer processor; and a software program residing in said computer processor;

wherein said software program comprises computer-executable instructions, stored on computer-readable media, and wherein said instructions, when executed by said computer processor, provide means for:

receiving an intruding radio frequency signal by a plurality of receivers;

measuring the received signal strength $R_i$ on each of said plurality of receivers;

for each paired combination of said plurality of receivers, computing one relative distance measurement d to the location of said transmitting source, said one relative distance measurement d being a function of said received signal strength $R_i$ of each said receiver in each said paired combination;

for each paired combination of said plurality of receivers, computing the possible locations of said transmitting source lying on the locus of points satisfying $$d=[R_1/R_2]^{1/2};$$

further comprising;

computing the displacement c of the center of said locus from the first receiver in each said paired combination;

computing the radius r of said locus;

and, computing the point about which said locus is centered;

computing the intermediate points of intersection of all said loci corresponding to all said paired combinations; and computing the actual points of intersection from said intermediate points of intersection of all said loci of points so as to determine an unambiguous location of said transmitting source.

16. Means for computing intermediate points of intersection of all said loci of points of claim 15, further comprising means for computing the $j^{th}$ intermediate point of intersection by computing the Euclidian distance L between the center points of each of said loci of points according to $$L = \sqrt{(x_{c2}-x_{c1})^2 + (y_{c2}-y_{c1})^2}$$

wherein ($x_{c1}, y_{c1}$) and ($x_{c2}, y_{c2}$) are the coordinates of the centers of an $i^{th}$ said locus of points having a radius $r_i$ and an $i^{th}+1$ said locus of points having a radius $r_2$, respectively;

mapping said $i^{th}$ locus center point onto the origin of x-y coordinate system and mapping said $i^{th}+1$ locus center point onto the x-axis of said coordinate system at a displacement L units along said x-axis from said $i^{th}$ locus center point;

locating a third point within the first quadrant of said coordinate system, said third point being displaced $r_1$ units from said first locus center point and $r_2$ units from said second locus center point so as to form the apex of a right triangle having base length $L_1$ and height h; and displaced θ units from said x-axis, counterclockwise about the origin;

so as to cause said third point to coincide with the coordinate ($L_1$, h).

17. Apparatus of claim 16, further comprising means for computing said base length $L_1$ according to $$L_1 = r_1 \cos θ.$$

18. Apparatus of claim 16, further comprising means for computing said height of said apex according to $$h = r_1 \sin \theta.$$

19. Apparatus of claim 16, further comprising means for computing the $j^{th}+1$ intermediate point of intersection by further
reflecting said $j^{th}$ intermediate point of intersection across the x-axis such that the coordinates of said $j^{th}+1$ intermediate point of intersection coincide with $(L_1, -h)$.

20. Apparatus of claim 16, further comprising means for computing the $k^{th}$ actual point of intersection by further
computing the counter clockwise angular displacement $\alpha$ of the center point of the $i^{th}+1$ said locus from the x-axis about the origin according to $$\sin \alpha = \frac{y_{c2} - y_{c1}}{L}$$

$$\cos \alpha = \frac{x_{c2} - x_{c1}}{L}$$

rotating said $j^{th}$ intermediate point of intersection by $\alpha$ units with respect to said $i^{th}$ locus center point;
translating said rotated $j^{th}$ intermediate point of intersection by a number of units equivalent to the displacement of said mapped $i^{th}$ locus center point from said $i^{th}$ locus center point; and
computing the coordinates $(x_3, y_3)$ of said translated and rotated $j^{th}$ intermediate point of intersection according to $$x_3 = L_1 \cos \alpha - h \sin \alpha + x_{c1}$$

$$y_3 = h \cos \alpha + L_1 \sin \alpha + y_{c1}$$

said coordinates $(x_3, y_3)$ being the location of said $k^{th}$ actual point of intersection.

21. Apparatus of claim 16, further comprising means for computing the $k^{th}+1$ actual point of intersection by further
computing the counter clockwise angular displacement $\alpha$ of the center point of the $i^{th}+1$ said locus from the x-axis about the origin according to $$\sin \alpha = \frac{y_{c2} - y_{c1}}{L}$$

$$\cos \alpha = \frac{x_{c2} - x_{c1}}{L}$$

rotating said $j^{th}+1$ intermediate point of intersection by $\alpha$ units with respect to said $i^{th}$ locus center point;
translating said rotated $j^{th}+1$ intermediate point of intersection by a number of units equivalent to the displacement of said mapped $i^{th}$ locus center point from said $i^{th}$ locus center point; and
computing the coordinates $(x_4, y_4)$ of said translated and rotated $j^{th}+1$ intermediate point of intersection according to $$x_4 = L_1 \cos \alpha - h \sin \alpha + x_{c1}$$

$$y_4 = h \cos \alpha + L_1 \sin \alpha + y_{c1}$$

said coordinates $(x_4, y_4)$ being the location of said $k^{th}+1$ actual point of intersection.

22. Apparatus of claim 15, further comprising means for computing the number of said loci M according to $$M = \binom{N}{2} = \frac{N^2 - N}{2}$$

wherein N represents the number of said receivers.

23. Method of claim 22, further comprising means for computing the number of intersections I between said loci according to $$I = 2\binom{M}{2} = M^2 - M = \frac{N^4}{4} - \frac{N^3}{2} - \frac{N^2}{4} + \frac{N}{2}.$$

24. Apparatus of claim 15 further comprising means for computing a linear regression of received signal strength $R_i$ versus distance.

25. Apparatus of claim 15 wherein said means for determining an unambiguous location of said transmitting source further comprising means for computing a clustering algorithm, said means for computing further comprising means for
computing the mean of the remaining actual points of intersection;
selecting said computed mean as the cluster center;
eliminating from the said cluster that actual point of intersection being furthest from said cluster center;
determining whether one-half of the original points of intersection have been eliminated;
IF one-half of the original points of intersection have NOT been eliminated,
THEN, returning to said step of computing the mean of the remaining actual points of intersection;
OTHERWISE, locating said transmitting source coincident with current said cluster center.

26. Apparatus of claim 15, where said means for computing said radius r, further comprises computing r according to $$r = \left| \frac{D}{2} \left[ \frac{1}{1+d} - \frac{1}{1-d} \right] \right|.$$

27. Apparatus of claim 15, where said means for computing the displacement c, further comprises means for computing c according to $$c = \frac{D}{2} \left[ \frac{1}{1+d} - \frac{1}{1-d} \right]$$

wherein D is the distance between said receivers in each said paired combination.

28. Apparatus of claim 15, where, in said means for computing the point about which said locus is centered, the coordinates $(x_c, y_c)$ represent said point, and said means for computing further comprises computed $(x_c, y_c)$ according to $$x_c = x_1 + \frac{c}{D}(x_2 - x_1)$$

$$y_c = y_1 + \frac{c}{D}(y_2 - y_1)$$

wherein $(x_1, y_1)$ and $(x_2, y_2)$ are the coordinates of the first and the second said receivers in each said paired combination, respectively.

29. Apparatus for locating transmitting sources of a radio frequency (RF) signal intrusion into a wireless network, comprising:
a computer network;
a plurality of wireless intrusion detection processors;
said wireless intrusion detection processor being in communication with said computer network and all elements connected thereto;
said wireless intrusion detection processor further comprising at least one wireless intrusion detection sensor for measuring received signal strength of said transmitting sources;
said at least one wireless intrusion detection sensor further comprising a first software program comprising computer-executable instructions, stored on computer-readable media, and wherein said instructions, when executed, provide means for:
receiving intruding radio frequency signals;
measuring the received signal strength $R_i$ of each of said intruding radio frequency signals;
communicating said measured signal strength $R_i$ of each of said intruding radio frequency signals to said wireless intrusion detection processor within which it resides;
a wireless intrusion detection concentrator processor;
said wireless intrusion detection concentrator processor being in communication with said computer network and all elements connected thereto;
said wireless intrusion detection concentrator processor further comprising a second software program comprising computer-executable instructions, stored on computer-readable media, and wherein said instructions, when executed, provide means for:
for each paired combination of wireless intrusion detection sensors, computing one relative distance measurement d to the location of said transmitting sources;
said one relative distance measurement d being a function of said received signal strength $R_i$ of each said wireless intrusion detection sensor in each said paired combination;
for each paired combination of said wireless intrusion detection sensors, computing the possible locations of said transmitting sources lying on the locus of points satisfying $d = [R_1/R_2]^{1/2}$ further comprising;
computing the displacement c of the center of said locus from the first receiver in each said paired combination;
computing the radius r of said locus; and,
computing the point about which said locus is centered;
computing the intermediate points of intersection of all said loci corresponding to all said paired combinations; and
computing the actual points of intersection from said intermediate points of intersection of all said loci of points so as to determine an unambiguous location of said transmitting source; and
an enterprise security management processor;
said enterprise security management processor being in communication with said computer network and all elements connected thereto;
said enterprise security management processor further comprising a third software program comprising computer-executable instructions, stored on computer-readable media, and wherein said instructions, when executed, provide means for:
displaying the geospace within which said wireless intrusion detection processors are located;
receiving and logging intrusion alerts; and
displaying intrusion time, location, signal strength and location of each said transmitting source of radio frequency (RF) signal intrusion.

30. Apparatus of claim 29 wherein said third software program comprises Hewlett Packard OpenView®.

31. Apparatus of claim 29, where said means for computing said radius r, further comprises computing r according to $$r = \left| \frac{D}{2} \left[ \frac{1}{1+d} - \frac{1}{1-d} \right] \right|.$$

32. Apparatus of claim 29, where said means for computing the displacement c, further comprises means for computing c according to $$c = \frac{D}{2} \left[ \frac{1}{1+d} - \frac{1}{1-d} \right]$$

wherein D is the distance between said receivers in each said paired combination.

33. Apparatus of claim 29, where, in said means for computing the point about which said locus is centered, the coordinates $(x_c, y_c)$ represent said point, and said means for computing further comprises computed $(x_c, y_c)$ according to $$x_c = x_1 + \frac{c}{D}(x_2 - x_1)$$

$$y_c = y_1 + \frac{c}{D}(y_2 - y_1)$$

wherein $(x_1, y_1)$ and $(x_2, y_2)$ are the coordinates of the first and the second said receivers in each said paired combination, respectively.

* * * * *